United States Patent
Dizdarevic et al.

(10) Patent No.: US 7,359,704 B1
(45) Date of Patent: Apr. 15, 2008

(54) REGISTRATION OF COMMUNICATIONS DEVICES

(75) Inventors: Jasminka Dizdarevic, Austin, TX (US); Simon Richardson, Pflugerville, TX (US); Mark Wuthnow, Austin, TX (US); Jessie Lee, Austin, TX (US); Richard Man-keung Tam, Austin, TX (US); Mark Enzmann, Roswell, GA (US); Charles Jamile Hamadi, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 622 days.

(21) Appl. No.: 10/624,401

(22) Filed: Jul. 22, 2003

Related U.S. Application Data

(60) Provisional application No. 60/397,962, filed on Jul. 23, 2002.

(51) Int. Cl.
*H04Q 7/20* (2006.01)
(52) U.S. Cl. .............................. 455/435.1; 455/432.1; 455/433; 455/428; 455/432.3
(58) Field of Classification Search ............. 455/435.1, 455/432.1, 433, 435.2, 428, 432.3
See application file for complete search history.

(56) References Cited

U.S. PATENT DOCUMENTS

| | | | | |
|---|---|---|---|---|
| 5,862,481 | A * | 1/1999 | Kulkarni et al. | 455/432.2 |
| 5,901,352 | A * | 5/1999 | St-Pierre et al. | 455/426.1 |
| 6,681,111 | B2 * | 1/2004 | Ahn et al. | 455/432.2 |
| 2002/0094811 | A1 * | 7/2002 | Bright et al. | 455/433 |
| 2002/0168960 | A1 * | 11/2002 | Jacobson et al. | 455/410 |
| 2003/0148791 | A1 * | 8/2003 | Ahn et al. | 455/559 |
| 2003/0224814 | A1 * | 12/2003 | Qu et al. | 455/517 |
| 2005/0079872 | A1 * | 4/2005 | Hutcheson et al. | 455/446 |
| 2005/0170855 | A1 * | 8/2005 | Comer et al. | 455/466 |

FOREIGN PATENT DOCUMENTS

| | | | |
|---|---|---|---|
| WO | WO 98/37724 | * | 8/1998 |
| WO | WO 00/56112 | * | 9/2000 |

\* cited by examiner

*Primary Examiner*—George Eng
*Assistant Examiner*—Huy Phan
(74) *Attorney, Agent, or Firm*—Coulter C. Henry; Parks Knowlton LLC; Paul E. Knowlton, Esq.

(57) ABSTRACT

Methods and apparatuses are disclosed for registering a subscriber to a communications network. One method receives a registration request to access a first communications network. The registration request is routed to a second communications network based upon an international mobile subscriber identity number associated with the subscriber. The international mobile subscriber identity number allows the subscriber to register with the second communications network.

11 Claims, 10 Drawing Sheets

REGISTRATION OF COMMUNICATIONS DEVICES

CROSS-REFERENCE TO PROVISIONAL APPLICATION

This patent claims the benefit of U.S. Provisional Patent Application No. 60/397,962, filed Jul. 23, 2002 and entitled "Method to Enable the SMS Service for the Subscribers Converted From GAIT TDMA Native to GAIT GSM Native," and this provisional patent application is incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATION

This patent also relates to the commonly-assigned U.S. patent application Ser. No. 10,624,213, filed Jul. 22, 2003, entitled "Messaging Service for Communications Devices, of which the "Brief Summary of the Invention" and the "Detailed Description of the Invention" sections are incorporated herein by reference.

BACKGROUND OF THE INVENTION

1. Field of the Invention

This invention generally relates to mobile communications and, more particularly, to methods for registering subscribers by communicating subscription profiles from a GSM communications network to a TDMA/CDMA communications network.

2. Description of the Related Art

Registration is a concern for mobile telecommunications service providers. Each time a subscriber enters a new coverage zone within a mobile switching center, and when a registration timer expires, the subscriber must register with the mobile switching center. The process of registration involves communicating the subscriber's subscription profile from the subscriber's Home Location Register to the mobile switching center. This subscription profile is used to process incoming and outgoing communications for the subscriber. A problem arises, however, when the subscriber's Home Location Register cannot be accessed by the mobile switching center. If the Home Location Register cannot be accessed, then the subscriber cannot register and, thus, the subscriber cannot send and/or receive communications.

A "foreign communications network" is an example. If the subscriber is trying to register with a foreign communications network, sometimes that foreign communications network cannot access the subscriber's Home Location Register. When, for example, a subscriber is activated in a Global System for Mobile (GSM) communications network, neither a Time Division Multiple Access (TDMA) communications network nor a Code Division Multiple Access (CDMA) communications network may be able to access the subscriber's Home Location Register. Because the GSM, TDMA, and CDMA communications networks operate using different signaling standards, the subscriber's Home Location Register may not be accessible to a foreign communications network using a different signaling standard. When, then, a foreign communications network is encountered, the registration process sometimes fails and the subscriber cannot send and receive communications.

Migration of subscribers is another example. Sometimes a telecommunications service provider will move, or "migrate," a subscriber's subscription profile from one network standard to another network standard. The subscriber's subscription profile, for example, may be migrated from a TDMA/CDMA communications network to a GSM communications network. After the subscriber's subscription profile is migrated, the TDMA/CDMA communications network must be re-provisioned to find and to access the subscriber's subscription profile on the GSM communications network. If the TDMA/CDMA communications network is not re-provisioned to find the subscriber's subscription profile, the registration process might fail, thus preventing the subscriber from sending and/or from receiving communications.

There is, accordingly, a need in the art for improved registration of subscribers, a need for improved methods and systems of accessing a subscriber's Home Location Register, a need for methods and systems to register a subscriber with a foreign communications network, and a need for improved methods and systems of migrating subscribers from one network to another network.

BRIEF SUMMARY OF THE INVENTION

The aforementioned problems, and other problems, are reduced by methods and systems to register a subscriber to a communications network. This invention mutes a registration request from a Time Division Multiple Access (TDMA) communications network, or from a Code Division Multiple Access (CDMA) communications network, to a Global System for Mobile (GSM) communications network. The routing of the registration request is based upon an International Mobile Subscriber Identity (IMSI) number associated with the subscriber. When the subscriber's subscription profile is maintained in the GSM communications network, this invention allows either the TDMA communications network or the CDMA communications network to obtain the subscriber's subscription profile. Even though the subscriber's subscription profile is maintained in the GSM communications network, this invention allows the subscriber to register and to send/receive communications signals using the TDMA communications network and/or the COMA communications network. Thus, the subscriber has access to any TDMA, CDMA, and/or GSM communications network.

This invention discloses methods for registering a subscriber to a communications network. One method receives a registration request to access a first communications network. The registration request is routed to a second communications network based upon an international mobile subscriber identity number associated with the subscriber. The international mobile subscriber identity number allows the subscriber to register with the second communications network. When the first communications network operates using a Global System for Mobile communications signaling standard, the second communications network operates using either a Time Division Multiple Access signaling standard or a Code Division Multiple Access signaling standard. If the first communications network operates using the Time Division Multiple Access signaling standard, the second communications network operates using either the Global System for Mobile communications signaling standard or the Code Division Multiple Access signaling standard. Similarly, when the first communications network operates using the Code Division Multiple Access signaling standard, the second communications network operates using either the Global System for Mobile communications signaling standard or the Time Division Multiple Access signaling standard.

Another embodiment of this invention describes another method for registering a subscriber to a communications network. Here a registration request is received at a mobile switching center, and the registration request is communicated from a subscriber to a Global System for Mobile communications network. The mobile switching center operates in either a Time Division Multiple Access communications network or a Code Division Multiple Access communications network. The registration request is forwarded to a Signaling Transfer Point and routed to an appropriate Home Location Register for that subscriber. The routing of the registration request, however, is based upon a mobile subscriber identification number associated with the subscriber. The mobile subscriber identification number allows either the Time Division Multiple Access communications network or the Code Division Multiple Access communications network to access the subscriber's information stored on the Home Location Register. The routing of the registration request may be accomplished using global title translation of global title digits in a signaling message from the Signaling Transfer Point. The global title translation determines the destination from the global title digits, which include the mobile subscriber identification number.

Another embodiment of this invention describes yet another method for registering a subscriber to a communications network. A registration request is received at a mobile switching center in a Global System for Mobile communications network. The registration request is received from a native subscriber. The term "native subscriber" means a subscriber whose communications service was activated in either a Time Division Multiple Access communications network or a Code Division Multiple Access communications network. The registration request is forwarded to a Signaling Transfer Point and routed to a Home Location Register. The routing of the registration request is based upon a mobile subscriber identification number associated with the native subscriber. The mobile subscriber identification number may be mapped, or referenced, to a signaling point code associated with the Home Location Register. The mobile subscriber identification number allows the Global System for Mobile communications network to access information associated with the native subscriber.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
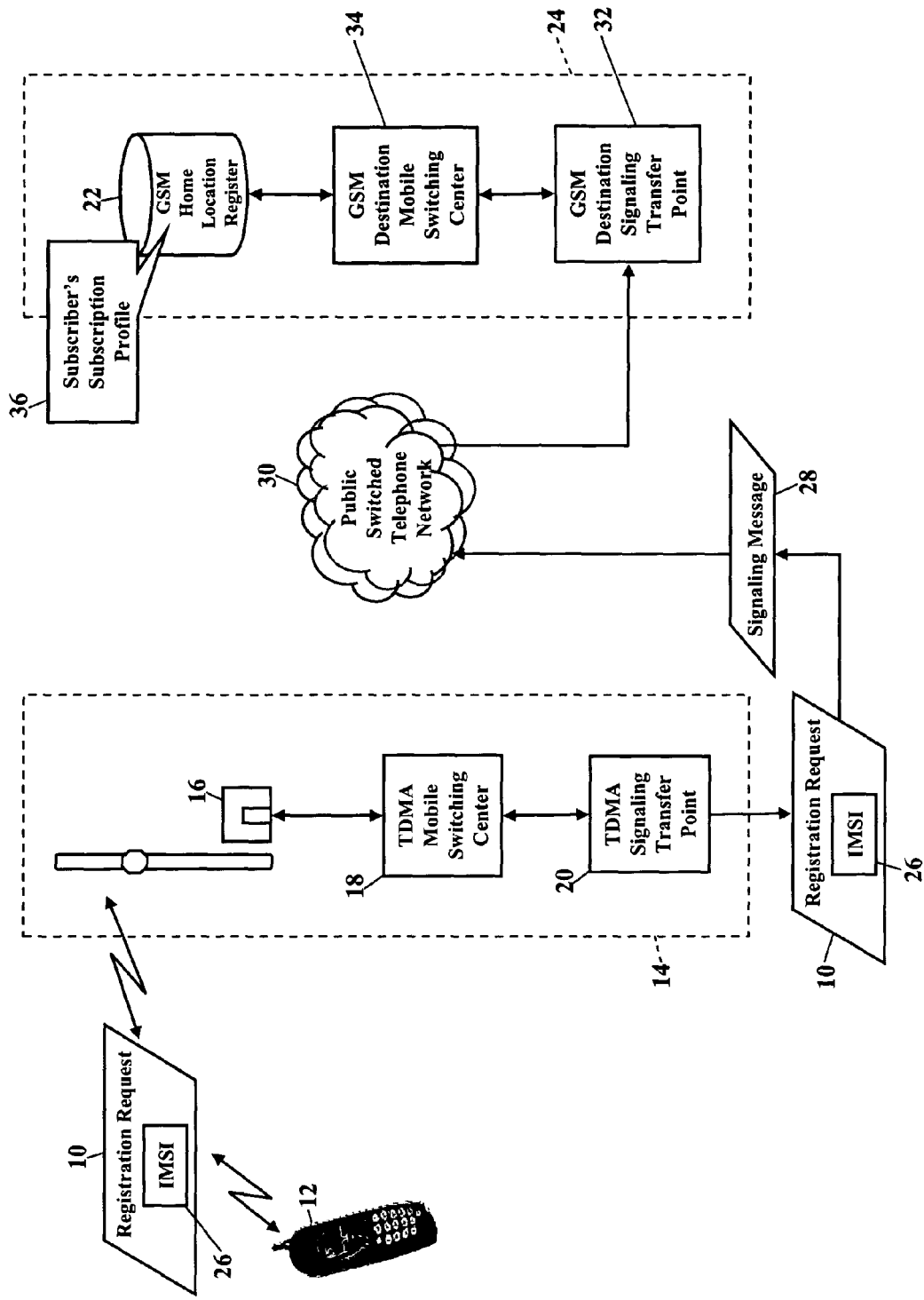
FIGS. 1 and 2 are block diagrams illustrating an embodiment of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention provides methods for migrating a subscriber from a first communications network to a second communications network, and then for registering that migrated subscriber to either of the first and second communications networks. In particular, certain embodiments of this invention route a registration request from a Time Division Multiple Access (TDMA) communications network, or from a Code Division Multiple Access (CDMA)

communications network, in which the subscriber's communications device is operating to a Global System for Mobile (GSM) communications network in which the subscriber is homed. The routing of the registration request is based upon an International Mobile Subscriber Identity (IMSI) number associated with the subscriber. When the subscriber's subscription profile is homed or otherwise maintained in the GSM communications network, this invention allows either the TDMA communications network or the CDMA communications network to obtain the subscriber's subscription profile. Even though the subscriber's subscription profile is maintained in the GSM communications network, this invention allows the subscriber to register and to send/receive communications signals using the TDMA communications network and/or the CDMA communications network. Thus, the subscriber has access to any TDMA, CDMA, and/or GSM communications network.

Migrating a subscriber from the first communications network, which in the exemplary embodiments is either a TDMA or a CDMA network, to the second communications network, which in the exemplary embodiments is a GSM network involves a process of reprovisioning certain elements of each of the networks. The process of reprovisioning the networks includes removing subscription profiles of the migrated subscribers from the first communications network and provisioning the second communications network with subscriber profiles corresponding to the migrated customers. By this process, the exemplary subscribers are converted from TDMA or CDMA native subscribers to GSM native subscribers. To enable the now migrated subscribers to register, certain elements in the communications must be reprovisioned as well.

Figure 2:
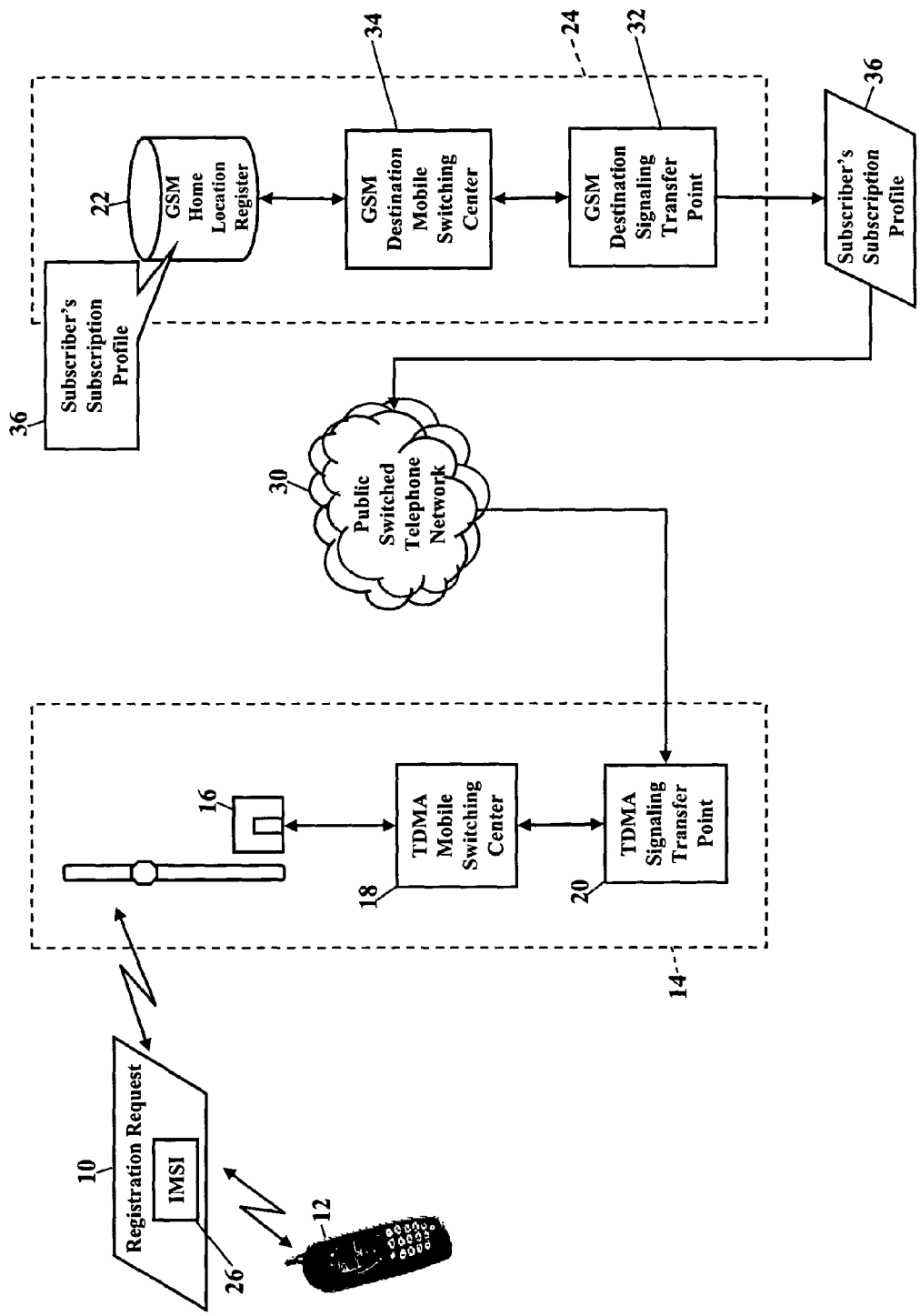

For example, FIGS. 1 and 2 are block diagrams illustrating an embodiment of this invention. A registration request 10 is communicated from a subscribers communications device 12. The subscribers communications device 12 operates using a Global System for Mobile (GSM) communications signaling standard. The term "communications device," as used herein, encompasses a mobile terminal (sometimes called "mobile station" or "mobile equipment"), a personal data assistant (PDA), a computer, a camera, a digital music device, or any other device that sends/receives communications signals. A first communications network 14 receives the registration request 10, and the registration request 10, in general terms, requests access to the first communications network 14. The first communications network 14 includes a base station 16, a TDMA Mobile Switching Center 18, and a TDMA Signaling Transfer Point 20. Although the subscriber's communications device 12 operates using the Global System for Mobile communications signaling standard, the first communications network 14, however, operates using a Time Division Multiple Access (TDMA) signaling standard. FIG. 1, then, shows the GSM subscribers communications device 12 attempting to register with the first TDMA communications network 14.

The subscribers appropriate Home Location Register 22 must be queried. The Home Location Register 22 is a database that stores subscription profiles for multiple subscribers. As FIG. 1 shows, however, when a communications device 12 operates in foreign mode in the first communications network 14, the subscriber's appropriate Home Location Register 22 is maintained in a second communications network 24. In this example, the second communications network 24 operates using the Global System for Mobile (GSM) communications signaling standard. Because the Home Location Register 22 is maintained in the GSM communications network 24, the Home Location Register 22 stores each subscriber's subscription profiles according to an International Mobile Subscriber Identity (IMSI) number associated with each subscriber. If an individual subscribers International Mobile Subscriber Identity number is known, the Home Location Register 22 may be queried for that subscriber's subscription profile.

The registration request 10, then, is routed to the subscriber's appropriate Home Location Register 22. When the first communications network 14 receives the registration request 10 from the subscriber's communications device 12, the registration request 10 includes an International Mobile Subscriber Identity (IMSI) number 26 associated with the subscriber. This International Mobile Subscriber Identity number 26 is then used to construct a signaling message 28. This signaling message 28 is used to identify and to locate the subscriber's Home Location Register 22. The first communications network 14 routes the registration request 10, with the signaling message 28, to the second communications network 24 and on to the subscribers Home Location Register 22. The registration request 10, with the signaling message 28, typically routes via a Public Switched Telecommunications Network 30. The registration request 10 and the signaling message 28, however, may also route along private networks. The registration request 10 and the signaling message 28 route along the Public Switched Telecommunications Network 30 to a Destination Signaling Transfer Point 32, to a Destination Mobile Switching Center 34, and then to the subscriber's Home Location Register 22. The registration request 10 and the signaling message 28 could alternatively directly route from the Destination Signaling Transfer Point 32 to the subscribers Home Location Register 22. Because the registration request 10 includes the International Mobile Subscriber Identity number 26 associated with the subscriber, the Home Location Register 22 may retrieve the subscriber's subscription profile 36.

The embodiment continues with FIG. 2. Once the subscriber's subscription profile 36 is retrieved, the subscription profile 36 is then returned to the first communications network 14 via the Public Switched Telecommunications Network 30. Although the subscriber's subscription profile 36 is maintained in the second communications network 24 (using the GSM signaling standard), this invention allows the first communications network 14 (using the TDMA signaling standard) to retrieve that subscription profile 36. Because the first communications network 14 now has access to the subscriber's subscription profile 36, the subscriber may register with the first communications network 14.

The registration request 10, as mentioned above in general terms, requests access to the first communications network 14. The registration request 10 initiates a process of authenticating the subscriber's communications device 12 and of updating the current location of the communications device 12. Because the registration process for the communications device is well known in the art, this patent will not further discuss the registration request 10. If, however, the reader desires more information on the registration process, the reader is directed to the following sources: LAWRENCE HARTE et al., GSM SUPERPHONES 150-52 & 170-73 (1999); JÖRG EBERSPÄCHER et al., GSM SWITCHING, SERVICES AND PROTOCOLS 40 (2001); and JOACHIM TISAL, GSM CELLULAR RADIO TELEPHONY 80-83 (1997), with each incorporated herein by reference.

As those of ordinary skill in the art also understand, the Home Location Register 22 stores the subscriber's subscription profile. The subscriber's subscription profile may include subscription service information, authentication information, and current location information. Because the physical and functional characteristics of the Home Location Register 22 are well known in the art, this patent will not further discuss the Home Location Register 22. If, however, the reader desires more information on the registration process, the reader is directed to the following sources: SIEGMUND REDL et al., GSM AND PERSONAL COMMUNICATIONS HANDBOOK 248-51 (1998); LAWRENCE HARTE et al., GSM SUPERPHONES 139-40, 150-52 & 170-73 (1999); JÖRG EBERSPÄCHER et al., GSM SWITCHING, SERVICES AND PROTOCOLS 38-39 (2001); GUNNAR HEINE, GSM NETWORKS: PROTOCOLS, TERMINOLOGY, AND IMPLEMENTATION 31-38 (1999); ASHA MEHROTRA, GSM SYSTEM ENGINEERING 54-55 (1997); and JOACHIM TISAL, GSM CELLULAR RADIO TELEPHONY 79-80 (1997), with each incorporated herein by reference.

Figure 3:
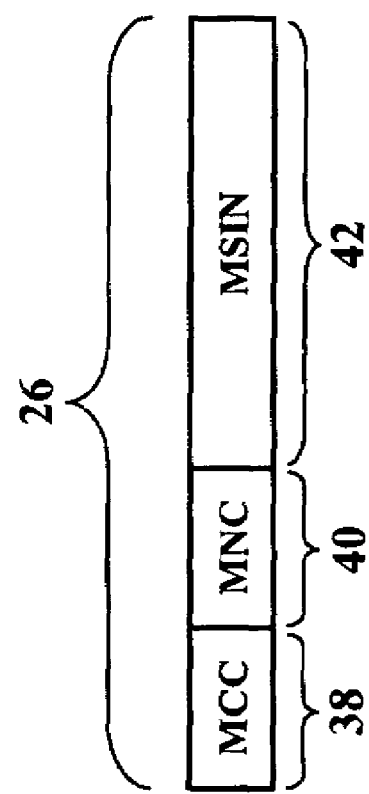
FIG. 3 is a schematic illustrating an International Mobile Subscriber Identity (IMSI) number associated with a subscriber according to an embodiment of this invention.

FIG. 3 is a schematic illustrating the International Mobile Subscriber Identity (IMSI) number 26 associated with the subscriber. As those of ordinary skill in the art recognize, each GSM subscriber is assigned the International Mobile Subscriber Identity number 26. The International Mobile Subscriber Identity number 26 includes a Mobile Country Code (MCC) 38, a Mobile Network Code (MNC) 40, and a Mobile Station Identification Number (MSIN) 42. The Mobile Country Code 38 identifies the subscriber's country of domicile. The Mobile Network Code 40 identifies the subscriber's home mobile network (e.g., the subscriber's Public Land Mobile Network), and the Mobile Station Identification Number 42 identifies the subscriber within that home mobile network. Because the structural coding for the International Mobile Subscriber Identity number 26 is well known in the art, this patent will not further discuss the Mobile Subscriber Identity number 26. If, however, the reader desires more information, the reader is directed to the following sources: SIEGMUND REDL et al., GSM AND PERSONAL COMMUNICATIONS HANDBOOK 350 (1998); JÖRG EBERSPÄCHER et al., GSM SWITCHING, SERVICES AND PROTOCOLS 32 (2001); GUNNAR HEINE, GSM NETWORKS: PROTOCOLS, TERMINOLOGY, AND IMPLEMENTATION 191-93 (1999); ASHA MEHROTRA, GSM SYSTEM ENGINEERING 40-43 (1997); and JOACHIM TISAL, GSM CELLULAR RADIO TELEPHONY 80-83 (1997), with each incorporated herein by reference.

Figure 4:
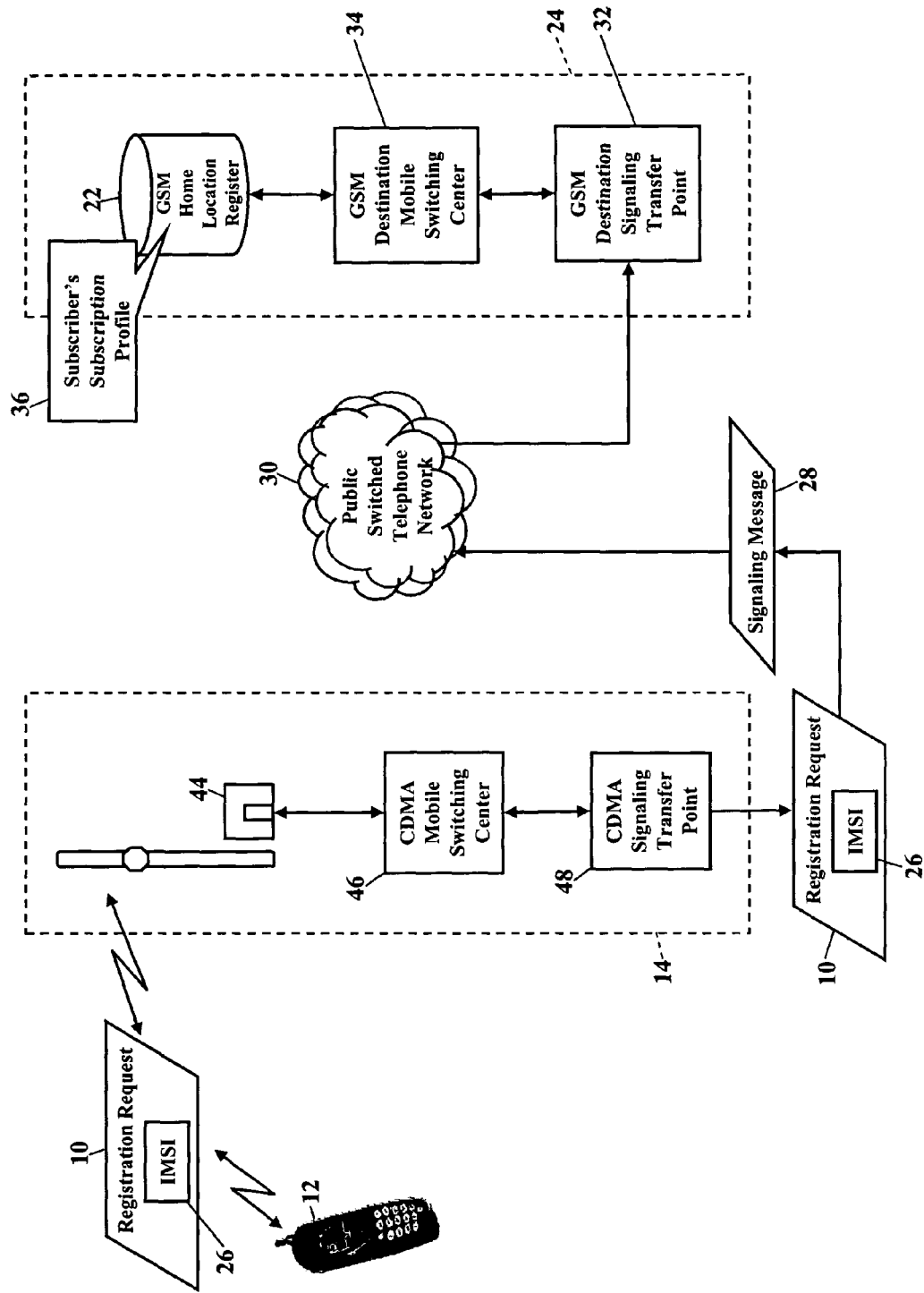
FIGS. 4 and 5 are block diagrams illustrating a Code Division Multiple Access (CDMA) communications network obtaining a subscriber's subscription profile from a Global System for Mobile (GSM) communications network according to an embodiment of this invention.
Figure 5:
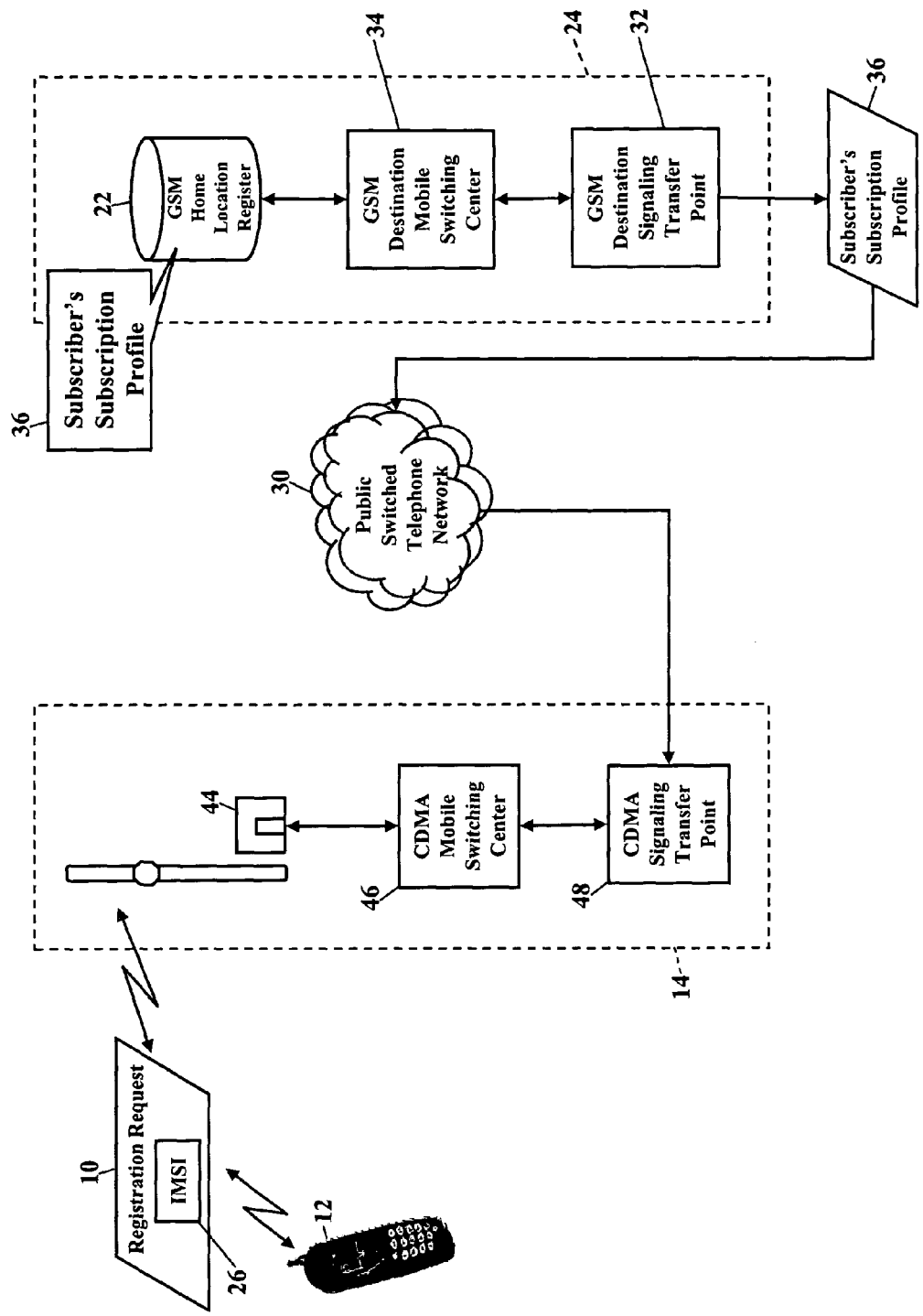

FIGS. 4 and 5 are block diagrams illustrating another embodiment of this invention. Here the first communications network 14 operates using a Code Division Multiple Access (CDMA) signaling standard, while the subscriber's communications device 12 operates using the Global System for Mobile (GSM) communications signaling standard. The first communications network 14 includes a CDMA base station 44, a CDMA Mobile Switching Center 46, and a CDMA Signaling Transfer Point 48. The subscriber's Home Location Register 22 is maintained in the second communications network 24, and the second communications network 24 operates using the Global System for Mobile communications signaling standard. When the first communications network 14 receives the registration request 10, the registration request 10 includes the International Mobile Subscriber Identity (IMSI) number 26 associated with the subscriber. The signaling message 28 is constructed using the International Mobile Subscriber Identity number 26. The first communications network 14 routes the registration request 10 and the signaling message 28 to the second communications network 24 via the Public Switched Telecommunications Network 30. The registration request 10 and the signaling message 28 route along the Public Switched Telecommunications Network 30 to the Destination Signaling Transfer Point 32, to the Destination Mobile Switching Center 34, and then to the subscriber's Home Location Register 22. The registration request 10 and the signaling message 28 could alternatively directly route from the Destination Signaling Transfer Point 32 to the subscriber's Home Location Register 22. Because the registration request 10 includes the International Mobile Subscriber Identity number 26 associated with the subscriber, the Home Location Register 22 may retrieve the subscriber's subscription profile 36. The Home Location Register 22 retrieves the subscriber's subscription profile 28 and, as FIG. 5 shows, the subscription profile 28 is returned to the first communications network 14. Although the subscriber's subscription profile 36 is maintained in the second communications network 24 (using the GSM signaling standard), this invention allows the first communications network 14 (using the CDMA signaling standard) to retrieve the subscription profile 36. Because the first communications network 14 now has access to the subscriber's subscription profile 36, the subscriber may register with the first communications network 14.

Figure 6:
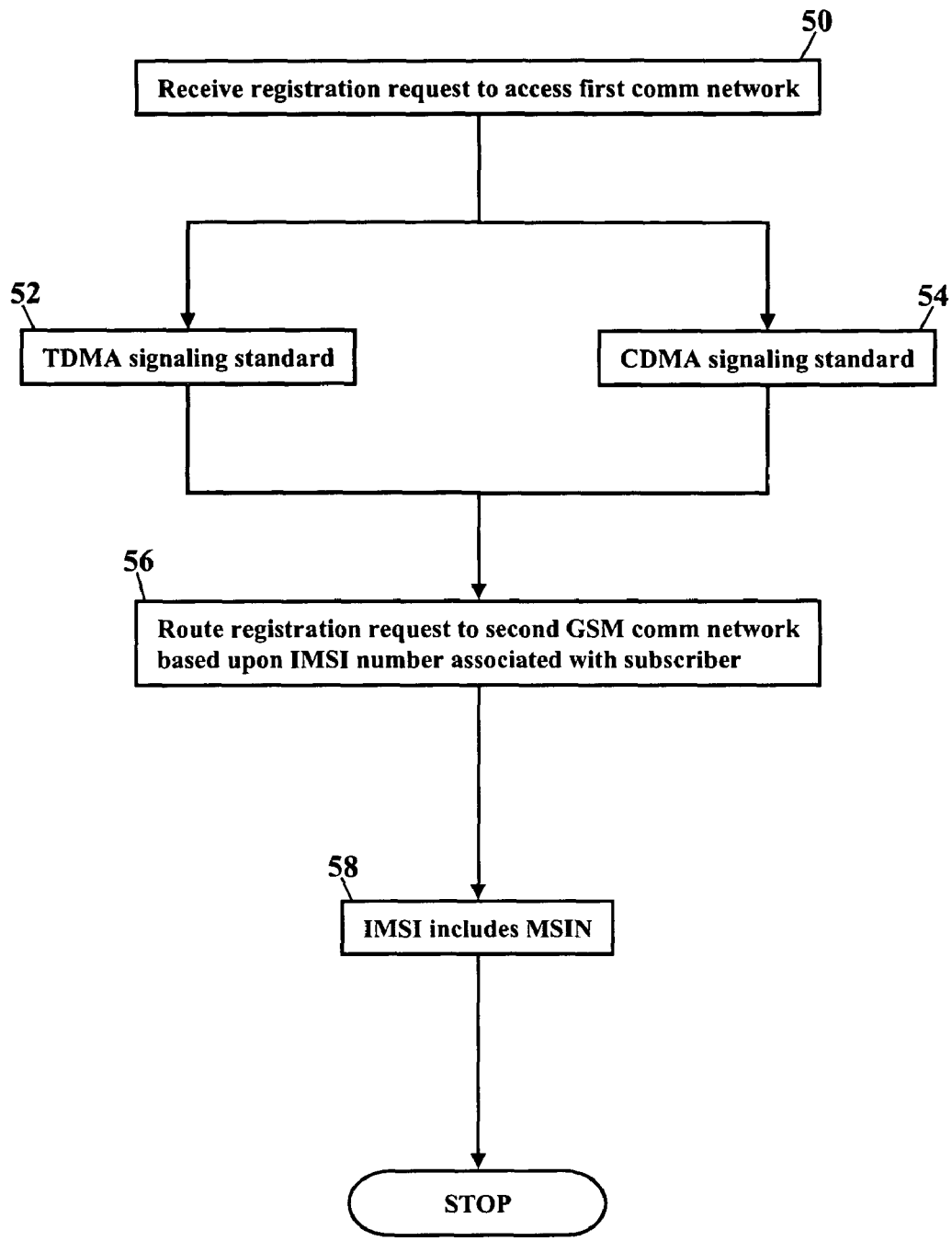
FIG. 6 is a flowchart illustrating a method for registering a subscriber to a communications network according to an embodiment of this invention.

FIG. 6 is a flowchart illustrating one method for registering a subscriber to a communications network. A registration request is received (Block 50) to access a first communications network. The first communications network may operate using a Time Division Multiple Access signaling standard (Block 52) or a Code Division Multiple Access signaling standard (Block 54). The registration request is routed to a second communications network (Block 56), and the routing of the registration request is based upon an International Mobile Subscriber Identity (IMSI) number associated with the subscriber. The International Mobile Subscriber Identity (IMSI) number may include a Mobile Subscriber Identification Number (Block 58). The second communications network operates using a Global System for Mobile communications signaling standard. The International Mobile Subscriber Identity number allows the subscriber to register with the first communications network.

EXAMPLE #1

Figure 7:
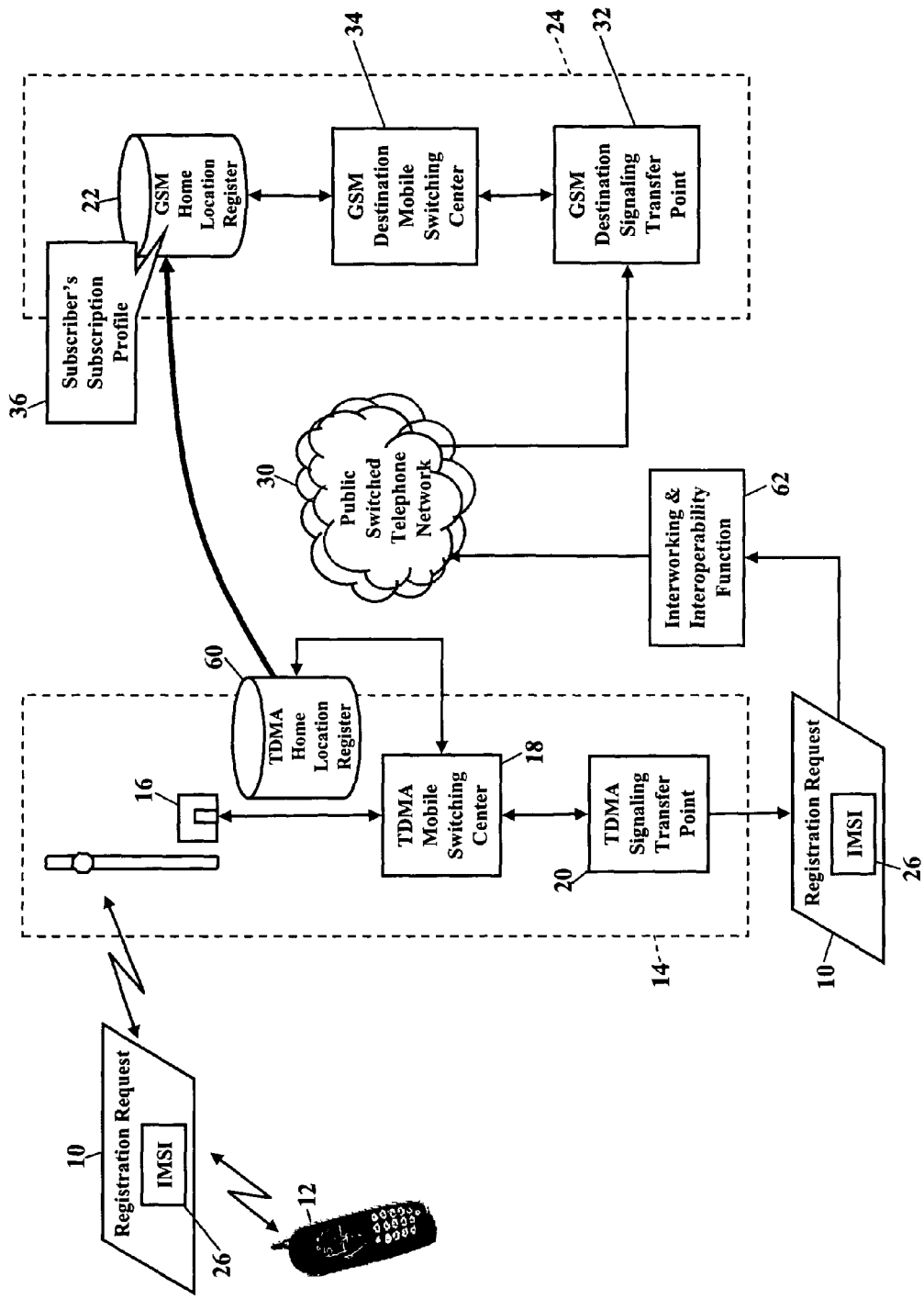
FIG. 7 is a schematic illustrating a non-limiting example of migrating a subscriber from a Time Division Multiple Access (TDMA) communications network to a Global System for Mobile (GSM) communications network according to an embodiment of this invention.

This invention is further illustrated by the following non-limiting example. FIG. 7 shows how the methods of this invention may be used to "migrate" a subscriber from a Time Division Multiple Access (TDMA) communications network 14 to a Global System for Mobile (GSM) communications network 24 and then to register the subscriber's communication device to the GSM network. The subscribers communications device 12, in this embodiment, is a "dual-mode" GSM-ANSI Interoperability Team (GAIT) device that can operate in both the first TDMA communications network 14 and in the second GSM communications network 24. When, however, the subscriber's subscription profile 36 is moved, or "migrated," from a TDMA Home Location Register 60 to the GSM Home Location Register 22, network routing must be modified to enable the communications device 12 to register in either 14, 24. As those of ordinary skill in the art understand, a TDMA communications network uses NPA-NXX based routing protocols to locate a subscriber's Home Location Register. A GSM communications network, on the other hand, uses a routing scheme based upon the subscribers International Mobile Subscriber Identity (IMSI) number. If the first TDMA communications network 14 uses NPA-NXX based protocols, the registration request 10 would incorrectly route to the TDMA Home Location Register 60. This NPA-NXX based protocol scheme would fail to locate the subscribers migrated GSM Home Location Register 22 in the second GSM communications network 24. It is not possible to simply reroute and entire NDA-NXX, and thus, and entire MSIN range, as the range may contain the number of TDMA customers that have not been migrated, i.e., whose subscriptions are still in the TDMA home locator register 60. In accordance with the present invention, reprovisioning therefore includes enabling the TDMA STP 20 to perform global title translation (GTT) on global title digits in each registration request 10, and provisioning the TDMA STP 20 so that the global title digits of migrated subscribers are mapped to the GSM HLR 22 via an Interworking and Interoperability Function 62. In this manner, the registration request 10 can be routed when the migrated communications device 12 is operating in TDMA foreign mode. In the exemplary embodiments the global title digits analyzed using GTT include the individual MSIN of the communications device 12. After migration, the MSIN 42 contained in the IMSI 26 points to the GSM HLR 22, which is accessed via the Interworking and Interoperability Function 62 because the GSM HLR 22 is in the GSM network 24.

FIG. 7, then, shows the Interworking and Interoperability Function 62. The Interworking and Interoperability Function 62 provides a signaling interface between the first TDMA communications network 14 and the second GSM communications network 24. This Interworking and Interoperability Function 62 enables service access when a subscriber operates in a foreign communications network, and that foreign communications network has a signaling protocol that is different from the subscriber's home communications network protocol. When the first communications network 14 receives the registration request 10, the registration request 10 is routed to the Interworking and Interoperability Function 62. The Interworking and Interoperability Function 62 then provides an interface with the second GSM communications network 24 and, thus, the subscriber's subscription profile 36 stored in the GSM Home Location Register 22. The subscriber's subscription profile 36 is retrieved and returned to the first communications network 14, allowing the subscriber to register with the first communications network 14.

EXAMPLE #2

Figure 8:
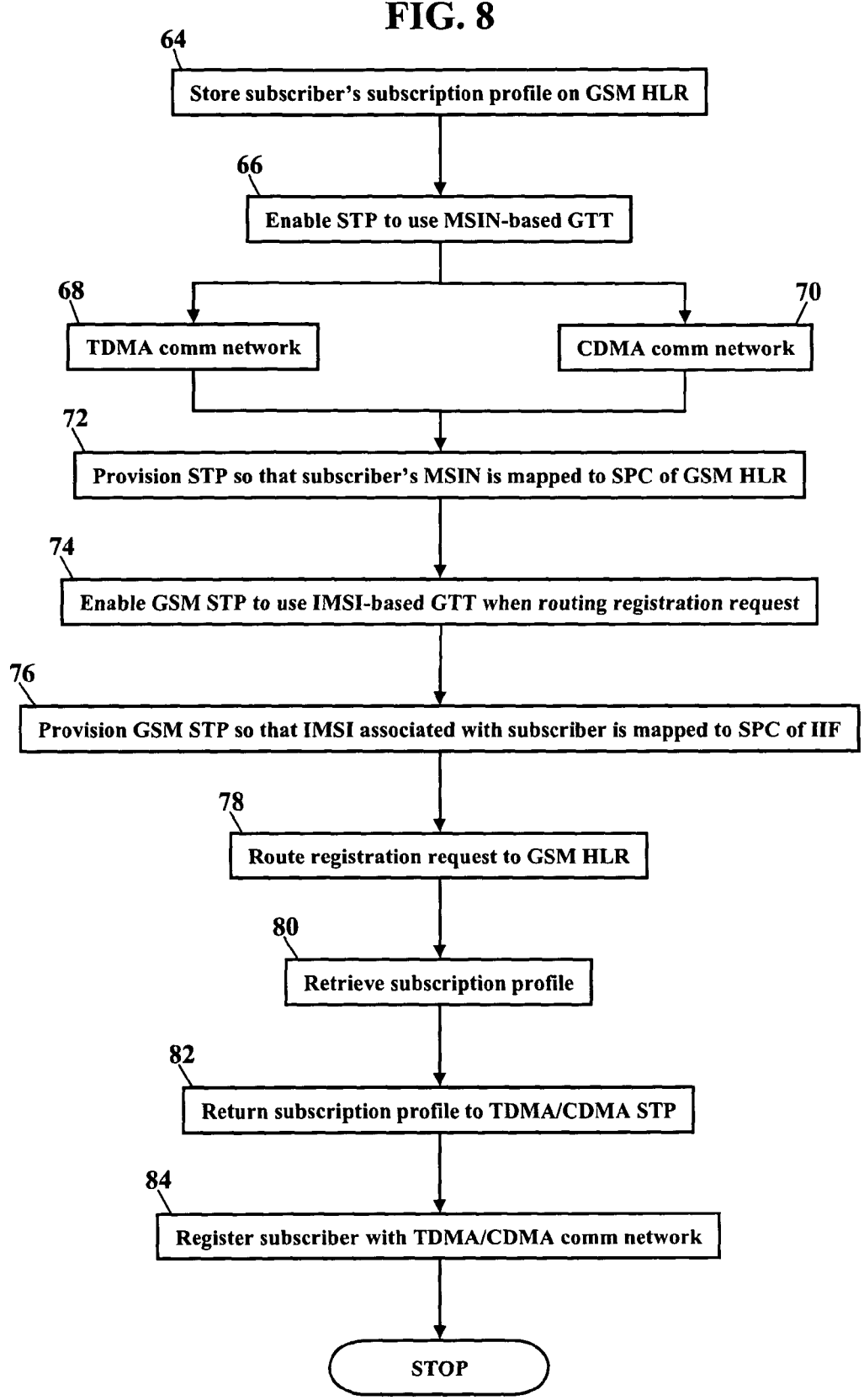
FIG. 8 is a flowchart illustrating another non-limiting example for registering a subscriber to a communications network according to an embodiment of this invention.
Figure 10:
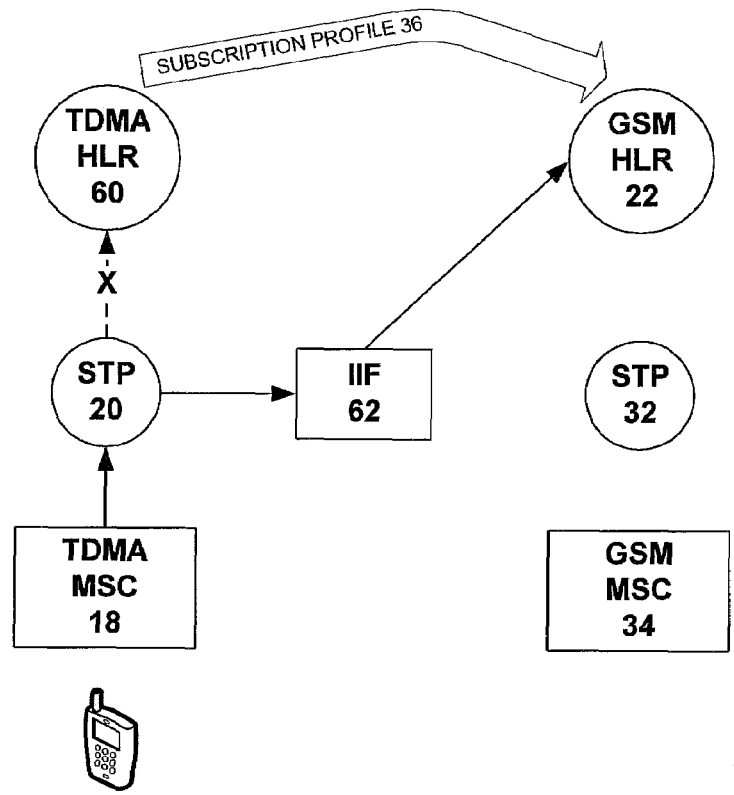
FIG. 10 is a schematic illustrating an example of migration and registration of a migrated subscriber in TDMA foreign mode.

This invention is further illustrated by FIG. 8 which is a flowchart illustrating a method for the post-migration provisioning performed in the TDMA network 14 and in the GSM network 24 to enable the GSM native communications device 12 to register. For operation in TDMA foreign mode this example re-provisions a Signaling Transfer Point to obtain a subscription profile from the Global System for Mobile (GSM) communications network 24 in response to receiving a registration request 10 from the migrated communications device 12. The subscribers subscription profile is stored on a GSM Home Location Register (HLR) (Block 64). A Signaling Transfer Point is reprovisioned to be enabled to use Mobile Subscriber Identification Number-based (MSIN-based) Global Title Translation (GTT) (Block 66) as opposed to NPA-NXX based routing. The Signaling Transfer Point 20, 48 may operate within a Time Division Multiple Access (TDMA) communications network (Block 68) or a Code Division Multiple Access communications network (Block 70). The Signaling Transfer Point 20, 48 is provisioned so that the subscriber's Mobile Subscriber Identification Number (MSIN) 42 is mapped to a Signaling Point Code (SPC) of the subscribers GSM Home Location Register (HLR) 22 (Block 72). As those of ordinary skill in the art understand, the Signaling Point Code is a unique code that is assigned to each node in an SS7 network. A GSM Signaling Transfer Point, in the GSM communications network, is enabled to use International Mobile Subscriber Identity (IMSI) number-based Global Title Translation (GTT) when routing a registration request 10 (Block 74). The TDMA/CDMA Signaling Transfer Point 20, 48 is also provisioned so that the International Mobile Subscriber Identity (IMSI) number associated with the subscriber is mapped to a Signaling Point Code (SPC) of an Interworking and Interoperability Function (IFF) 62 signaling interface (Block 76). As mentioned above, the IIF 62 functions as the interface between the two disparate networks 14, 24. The subscriber's registration request is then routed to the GSM Home Location Register (Block 78). The subscriber's subscription profile is retrieved (Block 80), and the subscription profile is returned to the TDMA/CDMA Signaling Transfer Point (Block 82). The subscriber may now register in TDMA foreign mode with the TDMA/CDMA communications network (Block 84) as shown in FIG. 10.

Figure 11:
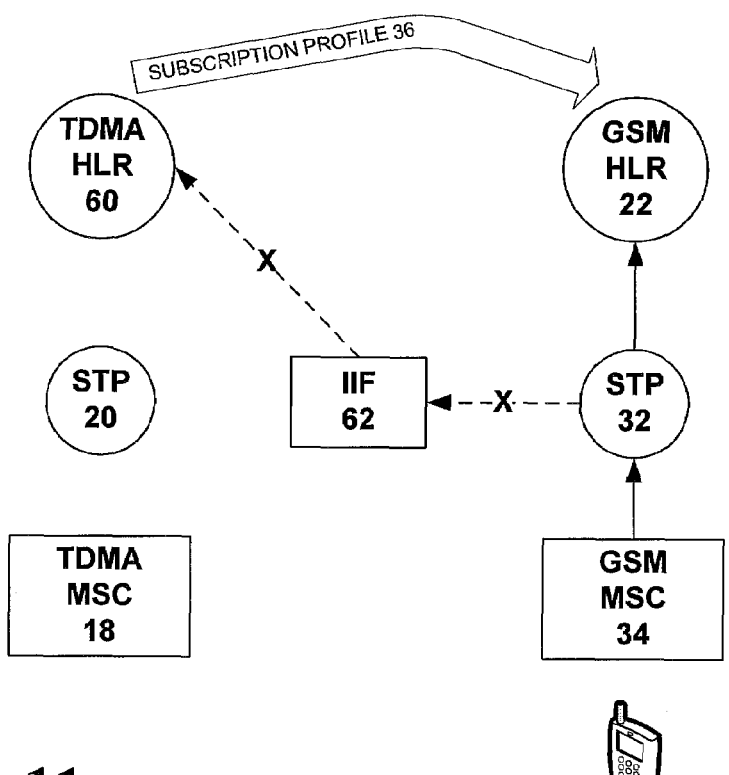
FIG. 11 is a schematic illustrating an example of migration and registration of a migrated subscriber in GSM native mode.

To register when operating in the GSM communications network 24, i.e., in GSM native mode, the GSM STP 32 must be reprovisioned. Before migration, the STP 32 was provisioned to route the registration request 10 from the then TDMA native communications device 12 to the IIF 62. After migration, the communications device 12 is now GSM native, so its registration request 10 is to be routed directly to the GSM HLR 22 instead of the IIF 62. This direct routing can be achieved by reprovisioning the STP 32 so that the IMSI 26 of the migrated communications device 12 is mapped to the SPC of the GSM HLR 22 in which its subscription now resides. More specifically, the STP 32 performs IMSI based global title translation (GTT) to route the registration request 10 to the GSM HLR 22 so that the subscriber may now register in GSM native mode with the GSM communications network 24, as shown in FIG. 11.

EXAMPLE #3

Figure 9:
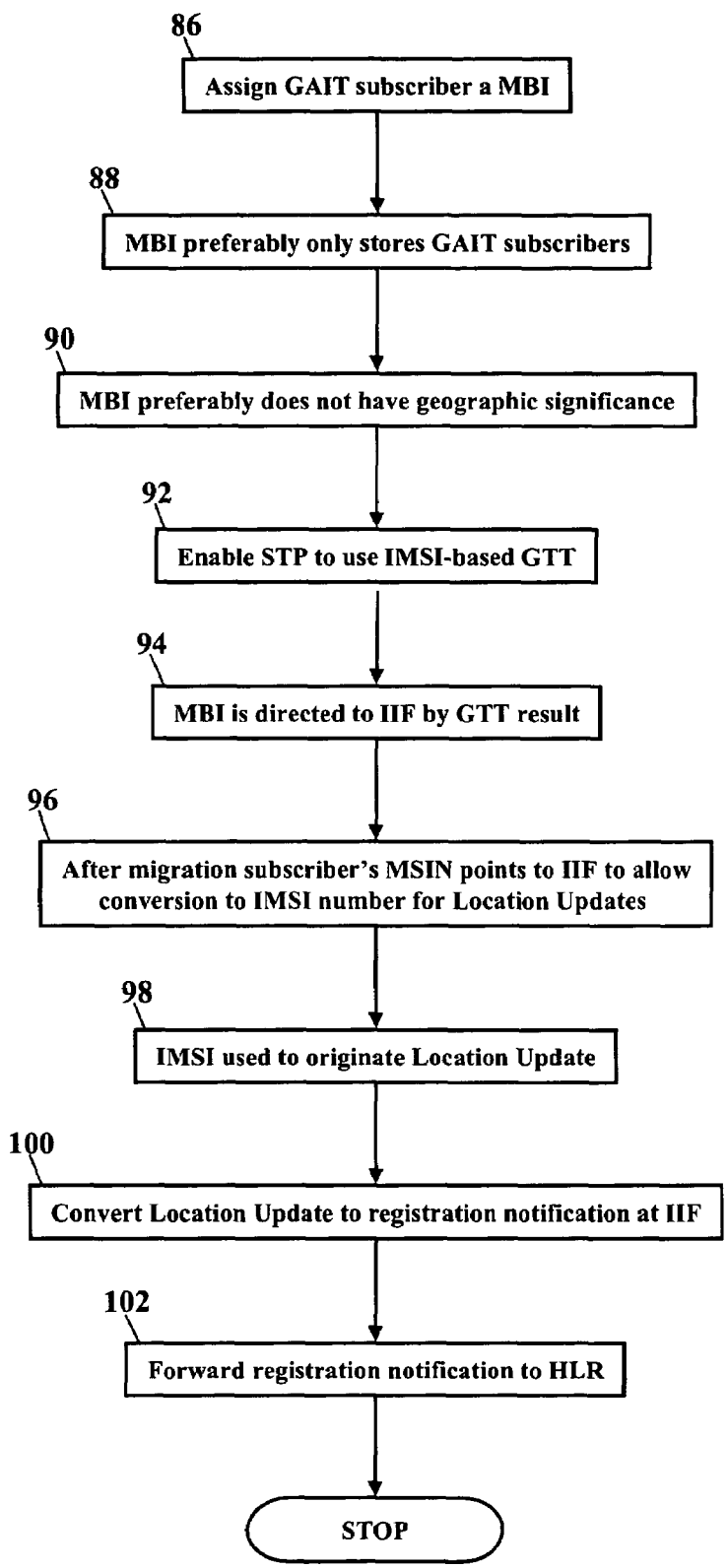
FIG. 9 is a schematic illustrating still another non-limiting example for registering a subscriber to a communications network according to an embodiment of this invention.

This invention is further illustrated by yet another non-limiting example. FIG. 9 is a flowchart illustrating another method for registering a subscriber to a communications network. This example again concerns GSM-ANSI Interoperability Team (GAIT) subscribers. That is, those subscribers whose communications device is a "dual-mode" device operable in both a TDMA communications network and In a GSM communications network. This example provides a method of identifying a GAIT subscriber and of ensuring the subscriber's Home Location Register is located and accessed. Here a unique Mobile Subscriber Identification Number range is utilized for GAIT subscribers that are migrating. Until the subscriber expresses a desire to migrate, all settings are as originally configured. The Mobile Subscriber Identification Number is assigned to the unit with over the air without disturbing mobile directory number settings. The flowchart of FIG. 9 permits the telecommunications service provider to forego any additional equipment purchase when migrating the subscriber.

As FIG. 9 shows, a GAIT subscriber is assigned a Mobile Subscriber Identification Number Block Identifier (MIBI) (Block 86). This Mobile Subscriber Identification Number Block Identifier (MBI) would preferably only store GAIT subscribers (Block 88). The Mobile Subscriber Identification Number Block Identifier would preferably not have geographic significance (Block 90). A Signaling Transfer Point (STP) is enabled to use Mobile Subscriber Identification Number-based (MSIN-based) Global Title Translation (GTT) (Block 92). The Mobile Subscriber Identification Number Block Identifier (MBI) is directed to the Interworking and Interoperability Function by the GTT result (Block 94). When a TDMA subscriber is migrated to GSM, the subscriber's Mobile Subscriber Identification Number (MSIN) now points to the Interworking and Interoperability Function to allow for conversion to International Mobile Subscriber Identity (IMSI) number for Location Updates (Block 96). The International Mobile Subscriber Identity (IMSI) number is used to originate a Location Update (Block 98), and this Location Update is converted to a registration notification at the Interworking and Interoperability Function (Block 100). This registration notification is then forwarded to the Home Location Register (Block 102).

While this invention has been described with respect to various features, aspects, and embodiments, those skilled and unskilled in the art will recognize the invention is not so limited. Other variations, modifications, and alternative embodiments may be made without departing from the spirit and scope of this invention.

What is claimed is:

1. A method for migrating a communications device from a first wireless communications network operating on a first standard to a second wireless communications network operating on a second standard, the communications device being assigned a mobile station identification number (MSIN), the method comprising:
    transferring a subscriber profile associated with the communications device from the first communications network to the second communications network, and associating the transferred subscriber profile to a subscriber identifier usable by the second communications network;
    associating the assigned MSIN with a block identifier that identifies the communications device as a member of a group of subscribers that is to be migrated to the second communications network:
    receiving a registration request from the communications device, the registration request including the block identifier and the MSIN;
    detecting the block identifier; and
    if the registration request is received in the first communications network:
        in response to detecting the block identifier, associating the MSIN with an interworking and interoperability function (IIF) and routing the registration request to the IIF.

2. The method of claim 1, further comprising:
    at the IIF, mapping the MSIN to the subscriber identifier, and forwarding the registration request including the subscriber identifier to the second communications network for processing by the second communications network.

3. The method of claim 1, further comprising:
    if the registration request is received in the second communications network:
        in response to detecting the block identifier, mapping the MSIN to the subscriber identifier, and processing the registration request including the subscriber identifier in the second communications network.

4. The method of claim 3, further comprising provisioning a signaling transfer point (STP) in the second communications network to detect the block identifier; wherein:
    mapping the MSIN to the subscriber identifier is performed at the signaling transfer point (STP) in the second communications network; and
    processing the registration request comprises performing global title translation on the subscriber identifier.

5. The method of claim 1, further comprising provisioning a signaling transfer point (STP) in the first communications network to detect the block identifier;
    wherein:
        associating the MSIN with an IIF is performed at the signaling transfer point (STP) in the first communications network; and
        routing the registration request to the IIF comprises performing global title translation on the MSIN.

6. The method of claim 1, further comprising in response to detecting the block identifier, converting the communications device to operate as native to the second communications network.

7. The method of claim 6, wherein the communications is converted over-the-air.

8. A method for registering a wireless device having a subscription profile that has been migrated from a first communications network operating on a first standard to a second communications network operating on a second standard, the wireless device being assigned a mobile station identification number (MSIN), the method comprising:
    associating the assigned MSIN with a block identifier, the block identifier indicating that the wireless device is a member of a group of subscribers that has been migrated to the second communications network;
    at a signaling transfer point (STP) in the first communications network, receiving a registration request from the wireless device, the registration request including the block identifier;
    in response to detecting the block identifier, associating the MSIN with an Interworking and Interoperability function (IIF);
    routing the registration request to the IIF; and
    at the IIF:
        mapping the MSIN to a subscriber identifier having a format that is usable by the second communications network; and
        forwarding the registration request including the subscriber identifier to the second communications network for processing by the second communications network.

9. A method for registering a wireless device that has been migrated to a Global System for Mobile (GSM) network, the wireless device being assigned a Mobile Subscriber Identification Number (MSIN), the method comprising:
    receiving a registration request at a mobile switching center (MSC) in a visited network selected from the group comprising: a Time Division Multiple Access (TDMA) network and a Code Division Multiple Access (COMA) network, the registration request including the MSIN;
    forwarding the registration request to a Signaling Transfer Point (STP) in the visited network;
    at the STP:
        detecting that the wireless device has been migrated by detecting a block identifier in the registration request indicating that the wireless device is a member of a group that has been migrated to the GSM network;
        in response to detecting that the wireless device has been migrated, analyzing the registration request using global title translation (GTT) based on the MSIN to identify a Home Location Register (HLR) in the GSM network containing a subscription profile associated with the subscribed wireless device, the subscription profile including an International Mobile Subscriber Identity (IMSI); and routing the registration request to an interworking and interoperability function (IIF); and at the IIF, mapping the MSIN to the IMSI and routing the registration request to the GSM HLR using the IMSI.

10. The method of claim 9, further comprising:

at the IIF, querying the GSM HLR using the IMSI to obtain location information associated with the subscription profile, and routing the location information to the MSC in the visited network.

11. The method of claim 9, wherein the step of detecting that the wireless device has been migrated comprises detecting the block identifier in the registration request by transferring the subscription profile to the GSM HLR.

* * * * *